(12) United States Patent
Czyszczewski et al.

(10) Patent No.: US 7,675,638 B2
(45) Date of Patent: Mar. 9, 2010

(54) NOTIFICATION ESCALATION IN PRINTING SYSTEMS USING DYNAMICALLY DETERMINED TIMEOUT VALUES

(75) Inventors: Joseph S. Czyszczewski, Longmont, CO (US); Suzanne L. Price, Longmont, CO (US); Douglas C. Seitz, Longmont, CO (US)

(73) Assignee: InfoPrint Solutions Company, LLC, Boulder, CO (US)

( * ) Notice: Subject to any disclaimer, the term of this patent is extended or adjusted under 35 U.S.C. 154(b) by 1050 days.

(21) Appl. No.: 11/331,720

(22) Filed: Jan. 13, 2006

(65) Prior Publication Data

US 2007/0279668 A1 Dec. 6, 2007

(51) Int. Cl.
*G06K 15/00* (2006.01)

(52) U.S. Cl. ............... 358/1.14; 358/1.1; 358/1.15; 399/8

(58) Field of Classification Search ....... 358/1.11–1.18; 399/8–11
See application file for complete search history.

(56) References Cited

U.S. PATENT DOCUMENTS

| | | | |
|---|---|---|---|
| 4,583,834 A | 4/1986 | Seko et al. | |
| 5,305,055 A | 4/1994 | Ebner et al. | |
| 5,414,494 A * | 5/1995 | Aikens et al. | 399/1 |
| 5,438,433 A * | 8/1995 | Reifman et al. | 358/468 |
| 5,748,884 A | 5/1998 | Royce et al. | |
| 6,184,995 B1 | 2/2001 | Sakai et al. | |
| 6,219,648 B1 * | 4/2001 | Jones et al. | 705/8 |
| 6,222,539 B1 | 4/2001 | Watts | |
| 6,504,621 B1 | 1/2003 | Salgado | |
| 6,615,161 B1 | 9/2003 | Carney et al. | |
| 6,622,266 B1 * | 9/2003 | Goddard et al. | 714/44 |
| 6,678,068 B1 * | 1/2004 | Richter et al. | 358/1.15 |
| 6,757,850 B1 * | 6/2004 | Lehner | 714/48 |
| 7,257,200 B2 * | 8/2007 | Valeriano et al. | 455/412.1 |
| 2002/0054322 A1 | 5/2002 | Geelen et al. | |
| 2003/0112452 A1 | 6/2003 | McIntyre | |
| 2004/0105122 A1 * | 6/2004 | Schaeffer | 358/1.15 |
| 2005/0102362 A1 | 5/2005 | Price et al. | |
| 2006/0087785 A1 | 4/2006 | Bender et al. | |
| 2006/0240803 A1 * | 10/2006 | Valeriano et al. | 455/412.1 |

FOREIGN PATENT DOCUMENTS

| | | |
|---|---|---|
| EP | 0578262 A1 | 1/1994 |
| JP | 11227306 A | 8/1999 |

* cited by examiner

*Primary Examiner*—Kimberly A Williams
(74) *Attorney, Agent, or Firm*—Duft Bornsen & Fishman LLP

(57) ABSTRACT

Methods and systems are provided for a printer controller in a printing system to flexibly define conditions for notification to one or more recipients of intervention states of the printing system. The time delay for transmitting escalated intervention notification message may be dynamically determined in accordance with present operating parameters of the printing system. Other aspects provide that the recipients of such messages and the form of such messages may be dynamically determined in accordance with present operating parameters of the printing system. Policy rules may define the predicate conditions for determining the timeout values for escalation and for determining the message format and recipients.

13 Claims, 5 Drawing Sheets

NOTIFICATION ESCALATION IN PRINTING SYSTEMS USING DYNAMICALLY DETERMINED TIMEOUT VALUES

BACKGROUND OF THE INVENTION

1. Field of the Invention

The invention relates to the field of printing systems, and in particular, to methods and systems for generating escalated intervention notifications for a printer based on dynamically changing parameters.

2. Statement of the Problem

Printing systems associated with data processing enterprises generally include a localized printer controller within the printing system. The printer controller controls overall operation of the printing system including, for example, host interfacing, page description language interpretation and rasterization, and lower level process control or interface features of the printing engine associated with the printing system. Host interaction may include appropriate adapters for coupling the printing system to one or more host systems utilizing one or more communication media and one or more communication protocols. Print jobs (often referred to as "raw print jobs") are received by the printing system from one or more attached host computer systems. The raw print jobs are generally encoded in the form of a page description language such as PostScript, HP PCL, IBM IPDS ("intelligent printer data stream"), etc. In addition, raw print jobs may be encoded as simple character streams (ASCII or EBCDIC) with no page description formatting associated therewith.

In addition, a printer controller of a printing system may include features to monitor status of the printing system to detect any status that requires operator intervention that is or may soon prevent continued operation of the printing system. For example, if the printing system is running low on toner or ink, operation may be paused until the ink or toner supply is replenished. Out of paper conditions, paper jam conditions, and many other exemplary states of the printing system that require operator intervention may be sensed by operation of the printer controller.

Simple network management protocol ("SNMP") and other device status and control protocols standardize communications between peripheral devices and management systems to permit exchange of notification messages therebetween. For example, when a printer controller of a printing system senses an intervention state of the underlying printing system, an SNMP exchange or other message exchange may notify the management system and/or an appropriate operator of the condition. In addition to SNMP exchanges, other messaging exchanges such as email, text messaging, so called "instant messaging", telephonic messaging, paging and the like have been employed to communicate the need for intervention to management systems and/or operators.

Though not specifically provided for in SNMP or other messaging protocols, some present intervention notification architectures allow for multiple messages to be sent to multiple receivers of a notification message. Such multiple transmissions allow multiple systems and/or operators to be notified of the intervention state. For example, a "key operator" and a "helpdesk representative" in an enterprise may both be notified regarding a particular intervention state of the printing system. Further, some known architectures allow for multiple intervention notification messages to be generated at different times—e.g., automatically escalating the status if a first notification message fails to resolve the problem. As presently practiced, a first notification message (or messages) may be sent when the intervention state is first sensed. If the condition is not addressed within a predetermined period of time, a second message (or a plurality of second messages) is sent to escalate the condition in hopes of clearing the condition to thereby allow continued operation of the printing system.

Though present notification architectures allow for some flexibility in generating and escalating the notification messaging, it remains an ongoing problem to provide still further flexibility in the type, number, timing and other aspects of notification messages, and especially escalated notification messages, generated from a printing system in response to sensing any of a variety of intervention states.

SUMMARY OF THE SOLUTION

The invention solves the above and other related problems with methods and associated systems and apparatus operable to flexibly define notification messages generated by a printing system relating to sensed intervention states of the printing system.

One aspect hereof provides a method operable within a printer controller of a printing system. The method includes sensing an intervention state of the printing system and transmitting an initial notification message to one or more recipients to notify of the sensed intervention state. The method also includes dynamically determining a timeout value to await removal of the intervention state. The timeout value is determined in accordance with one or more operating parameters associated with the printing system. The method also includes transmitting an escalated notification message to one or more recipients in response to expiration of the timeout value Another aspect hereof provides a printer controller associated with a printing system. The printer controller includes an event sensor adapted to sense an event in the printing system and a notification manager coupled to the event sensor. The notification manager, in turn, includes an initial notification transmitter to transmit an initial notification message in response to sensing the event. The notification manager also includes a timeout determination element to dynamically determine a timeout value. The timeout value is used to await removal of the sensed event and is determined in accordance with one or more operating parameters associated with the printing system. The notification manager also includes an escalated notification transmitter operable in response to sensing expiration of the timeout value and adapted to transmit an escalated notification message to one or more recipients.

Yet another aspect hereof provides a method operable in a printer controller of a printing system for generating notification messages regarding intervention states of the printing system. The method includes transmitting one or more initial notification messages regarding a sensed intervention state of the printing system and escalating the intervention state after a dynamically determined period of time through which the intervention state remains active. The method also includes transmitting one or more escalated notification messages in response to expiration of the dynamically determined period of time.

The invention may include other exemplary embodiments described below.

DESCRIPTION OF THE DRAWINGS

The same reference number represents the same element on all drawings.

DETAILED DESCRIPTION OF THE INVENTION

FIGS. 1-6 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
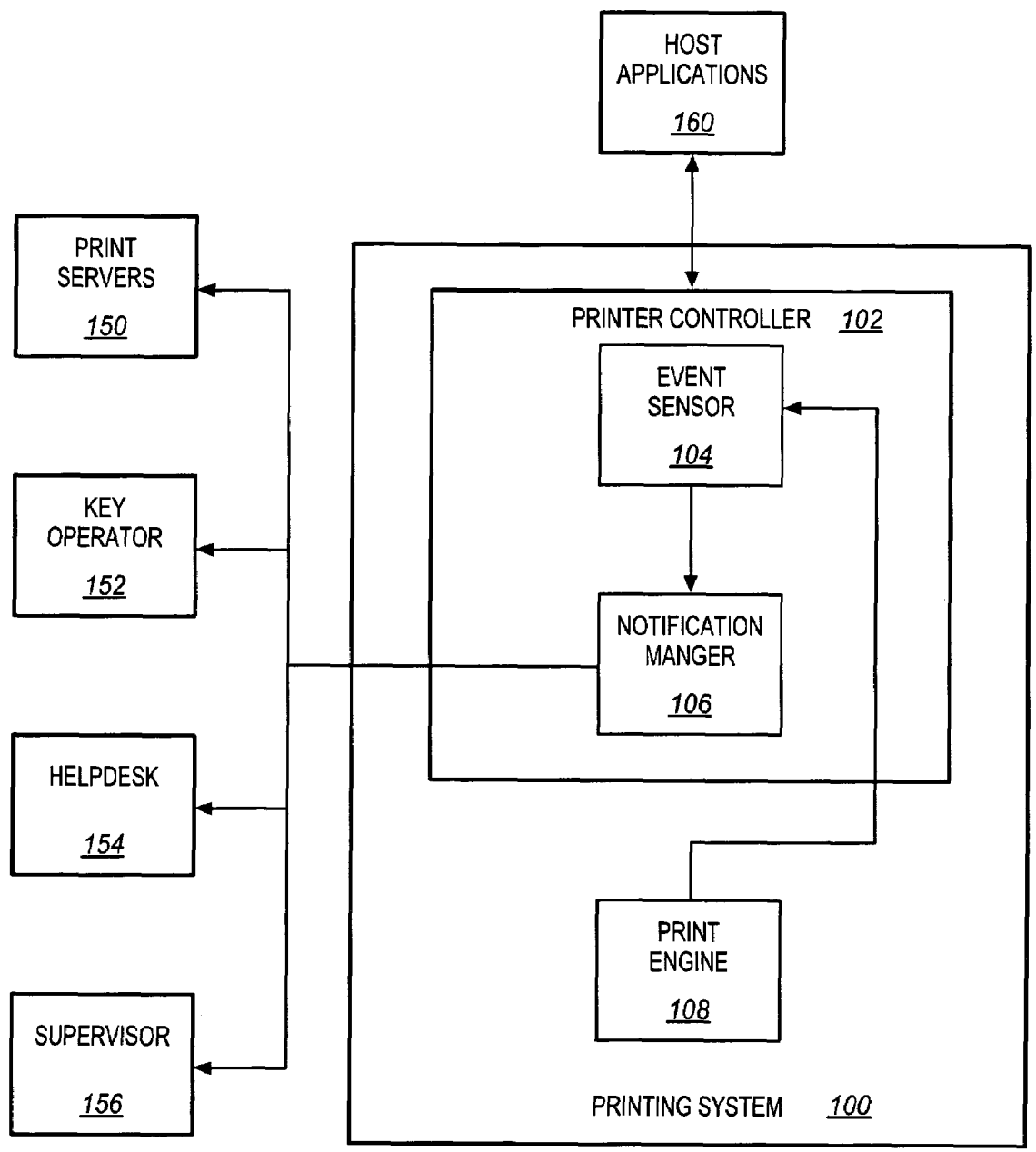
FIG. 1 is a block diagram of an exemplary printing system enhanced in accordance with features and aspects hereof to enhance flexibility of transmission of escalated intervention notification messages in accordance with operating parameters of the printing system.

FIG. 1 is a block diagram describing a printing system 100 enhanced in accordance with features and aspects hereof to include improved escalation management of intervention notification messaging between the printing system 100 and recipients 150 through 156 of such messaging. Printing system 100 generally includes printer controller 102 to control overall operation of the printing system 100 including interaction with one or more host applications 160 and interaction with the print engine 108. As is generally known in the art, printer controller 102 includes features (not shown) for receiving print jobs from attached host applications 160, translating or transforming the received print jobs from a received first encoding into a second encoding and eventually into rasterized page images to be forwarded to the print engine 108. Print engine 108 receives rasterized images from printer controller 102 and affixes the images onto paper medium. Printing system 100 may be of the continuous form type in which continuous form paper media is fed through the printing engine or may be of a cut sheet type where individual cut sheets of paper are imprinted under control of the printer controller. Interactions between printer controller 102 and host applications 160 or between printer controller 102 and print engine 108 may utilize well known protocols and communication media for exchanging information therebetween.

As noted above, printer controller 102 is also responsible for monitoring status of the printing system 100 and, in particular, status of print engine 108 within printing system 100. If a particular state of the printing system 100 is detected that may require human intervention, printer controller 102 senses such an intervention state and coordinates activities with appropriate operators to remove the intervention state to permit continued printing operation. For example, if the print engine runs out of paper on which to print or needs to change the size of paper, human operator intervention is typically required and printer controller 102 will sense such an intervention state. Those of ordinary skill in the art will readily recognize numerous other intervention states of printing system 100 that may be sensed by printer controller 102 to manage processing thereof.

The printer controller 102 may generally include an event sensor 104 adapted to monitor status of the printing system 100 and in particular status of print engine 108. When event sensor 104 of printer controller 102 senses a state of the printing system that may require operator intervention, notification manager 106 is responsive thereto to generate and transmit appropriate notification messages forwarded to one or more appropriate recipients. Exemplary recipients may include an automated print server system 150, a key operator 152, a help desk operator 154, and a supervisor 156. Any number and types of such recipients for such notification messages from printing system 100 may be provided.

In general, notification manager 106 is operable to evaluate policy rules to determine when an initial notification message fails to effectuate clearing of the intervention state and hence should be escalated to another notification message sent to the same or different recipients using the same or different messaging formats and protocols. Escalation as managed by notification manager 106 may entail altering the time at which a next escalated notification message is sent, and/or the recipient or recipients of a next escalated notification message to be transmitted, and/or the format or protocol for a next escalated notification message to be transmitted. Thus, notification manager 106 is operable utilizing the policy rules to flexibly define a policy for escalation of notification messages associated with intervention states of printing system 100.

Those of ordinary skill in the art will recognize a wide variety of other elements useful in a fully functional printing system 100, in particular, in an operational printer controller 102. Such other elements are generally well known to those of ordinary skill in the art and eliminated here for the sake of brevity of this discussion.

Figure 2:
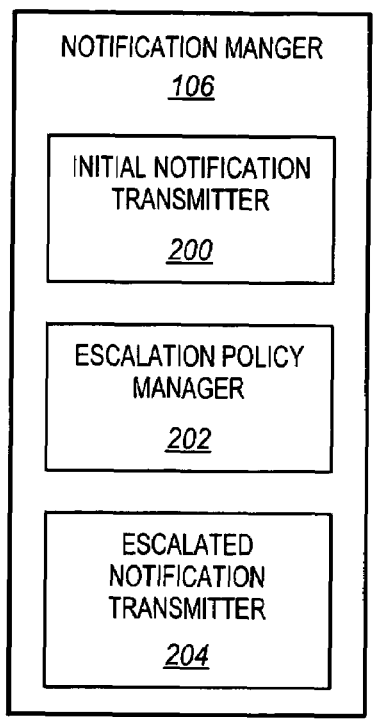
FIG. 2 is a block diagram of exemplary additional details of a notification manager of FIG. 1.

FIG. 2 is a block diagram providing additional details of elements within an exemplary notification manager 106. In one aspect hereof, notification manager 106 may include an initial notification transmitter 200, and escalation policy manager 202, and an escalated notification transmitter 204. Initial notification transmitter 200 transmits a first or initial notification message in response to initial sensing of an intervention state in the printing system. Following initial notification message transmission, escalation policy manager 202 is operable to determine how and when to escalate attention for the intervention state if it is not cleared. In general, escalation policy manager 202 is operable to determine when to escalate transmission of an intervention notification message by dynamically determining timeout values in accordance with present operating parameters of the printing system. In addition, escalation policy manager 202 may determine how an intervention state is to be escalated by dynamically modifying the recipients of the notification message and/or the mode of transmitting the message. The message recipients and message format may also be dynamically determined in accordance with operating parameters of the printing system. When escalation policy manager 202 determines that one or more escalated intervention notification messages should be sent at a particular time, escalation notification transmitter 204 is operable to generate and transmit a next intervention notification message to particular recipients using selected messaging formats.

As noted above, the initial notification message and any escalated notification messages may be implemented in any of several well-known messaging protocols and communicated via any of several associated communication media. For example, notification messages may be exchanged in accordance with SNMP standards, via e-mail messaging standards, via instant messaging standards, via text messaging standards, as well as telephony, paging, and any other messaging capability useful for contacting an identified person to resolve the intervention state.

Those of ordinary skill in the art will recognize that notification manager 106 may include other functional elements to provide complete functionality to interact with the event sensor and other components of the printer controller. Such other elements of notification manager 106 are well known to those of ordinary skill in the art and are eliminated here in for the sake of brevity. Further, those of ordinary skill in the art will recognize numerous other functional decompositions where elements of notification manager 106 may be further integrated or further separated into other operational elements. Such options are well known matters of design choice for those of ordinary skill in the art.

Figure 3:
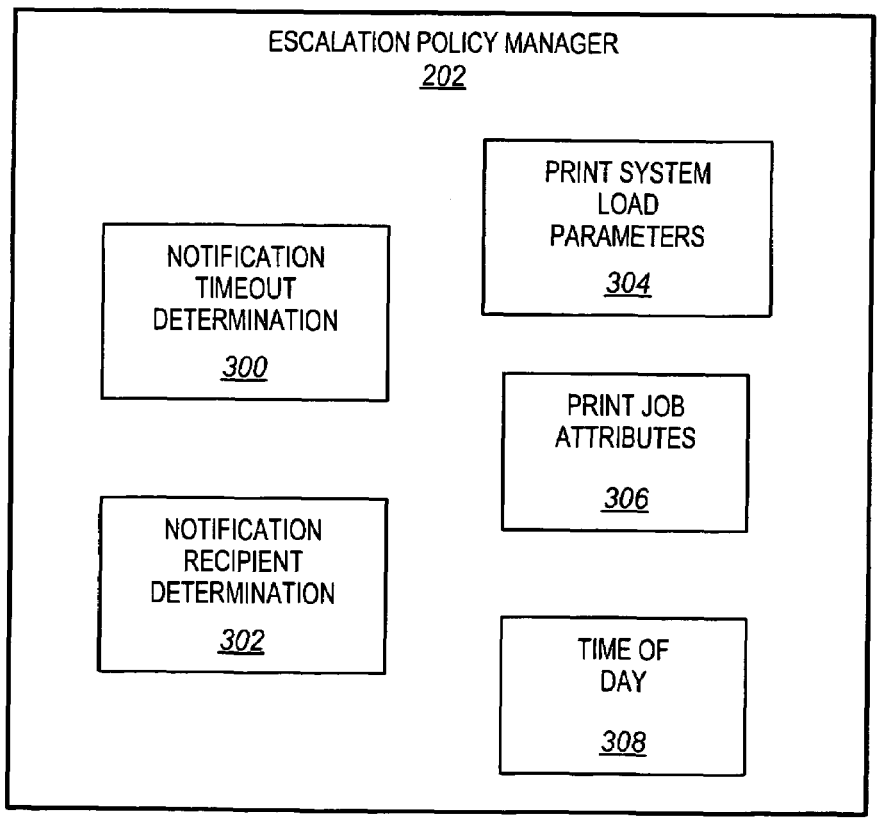
FIG. 3 is a block diagram of exemplary additional details of an escalation policy manager of FIG. 2.

FIG. 3 is a block diagram providing additional exemplary details of escalation policy manager 202. Escalation policy manager 202 is generally operable to determine when an escalated intervention message should be sent, in what form the message should be sent, and to whom such an escalated notification message should be sent. In one aspect hereof, escalation policy manager 202 may encode such policy rules as Boolean predicates to be evaluated based on operating parameters of the printing system. Encoding of such rules as Boolean predicate logic is well known to those of ordinary skill in the art and may be implemented as software or as equivalent custom circuit architectures.

Escalation policy manager 202 may include notification timeout determination element 300 operable to determine the timeout values associated with one or more present operating parameters of the printing system. Policy rules evaluated by element 300 may determine timeout values associated with each of any number of operating parameters of the printing system. Notification recipient determination element 302 evaluates policy rules to determine the appropriate recipients and the form of messaging for such recipients based upon present operating parameters associated with the printing system. Exemplary operating parameters may include, for example, printing system load parameters 304, print job attributes 306, and time of day component 308.

Printing system load parameters 304 may include operating parameters associated with the present load of the printing system. For example, a printer controller may determine that an escalated intervention message should be sent sooner than later where the number of jobs queued in the printing system is high or where the number of pages queued for jobs in the printing system is high. Conversely, an escalated intervention message may be deferred until later if the number of jobs or pages queued in the printing system is lower than a threshold value. The particular threshold value for such determinations is a simple matter of design choice well known to those of ordinary skill in the art as appropriate to a particular printing application.

Print job attributes 306 may include operating parameters associated with one or more presently queued jobs or presently printing jobs within a printing system. For example, an escalated intervention message may be sent sooner than later if a particular job in the printing system is submitted from particular identified computers coupled to the printing system. Conversely, an escalated intervention message may be deferred until a later time if no jobs presently known to the printing system are from an identified list of higher priority computers. In other words, transmission of an escalated intervention message may be advanced in time if one or more print jobs in the printing system are submitted from a higher priority or highly valued computing system whereas the escalated intervention message may be deferred if no such high priority computing system has submitted a print job.

In like manner, print job attributes element 306 may include evaluation of user or application assigned job priorities. If a print job has been submitted to the printing system having a high user assigned priority value, transmission of an escalated intervention message may be advanced otherwise the escalated intervention message may be deferred until a later point in time.

Still further, print job attributes 306 may include evaluation of operating parameter values identifying the requesting user or application for each print job known to the printing system. For example, where a highly valued executive submits a print job, an escalated intervention message may be advanced for transmission whereas if no higher priority executive job has been submitted, the escalated intervention message may be deferred until a later time.

Still further, print job attributes 306 may include evaluation of a specific time deadline associated with one or more print jobs. If a print job has been submitted to the printing system indicating a critical deadline is approaching, the escalated intervention message transmission may be advanced otherwise the escalated transmission may be deferred until later. Numerous other print job attributes will be readily apparent to those of ordinary skill in the art for evaluation in accordance with policy rules defined within the printing system.

Time of day component 308 may also be used as an operating parameter of the printing system such that an escalated intervention message may be transmitted earlier if the present time of day is nearing the end of a business period such as the end of the business day or end of a particular shift for key service personnel.

Other operating parameters of the printing system will be readily apparent to those of ordinary skill in the art to be included within escalation policy manager 202. In addition, escalation policy manager 202 may be simplified to eliminate certain operating parameters as irrelevant to particular printing system applications.

Still further, the above and other operating parameters may be used in a similar fashion to determine appropriate recipients of an intervention message as well as a desired form of messaging. For example, where operating parameters suggest a more critical nature of the intervention state based on operating parameters of the printing system, a higher level management or technical individual may be sent a next escalated message to advance the criticality of resolution. Otherwise, a next operator in some standard sequence of the hierarchy may be notified upon transmission of the next escalated intervention message. Still further, the type of message may be advanced based on criticality indicated by evaluation of the present operating parameters of the printing system. For example, where the operating parameters indicate that the resolution of the intervention state is more critical, more direct messaging techniques may be advanced in transmission of the next escalated intervention message. For example, direct telephony messaging or paging may be employed rather than e-mail or text messaging features.

Element 302 represents such processing to determine an appropriate notification recipient and form of messaging based on present operating parameters of the printing system.

Those of ordinary skill in the art will readily recognize that the structures of FIGS. 1, 2, and 3 may be implemented as suitably programmed instructions operating within a general or special purpose processor of the printer controller or may be implemented as custom designed logic circuitry implementing similar logic for managing escalation of intervention messages. In addition, those of ordinary skill in the art will recognize that features and aspects hereof may be implemented in a printer controller integral within the printing system as well as within printer controller computing nodes external to the printing system but coupled thereto in a manner capable of sensing intervention states and coupled to communication paths for generating and transmitting notification intervention notification messages to intended recipients. Thus, structures shown in FIGS. 1, 2, and 3 are intended merely as exemplary of possible embodiments of features and aspects hereof. Numerous equivalent structures will be readily apparent to those of ordinary skill in the art.

Figure 4:
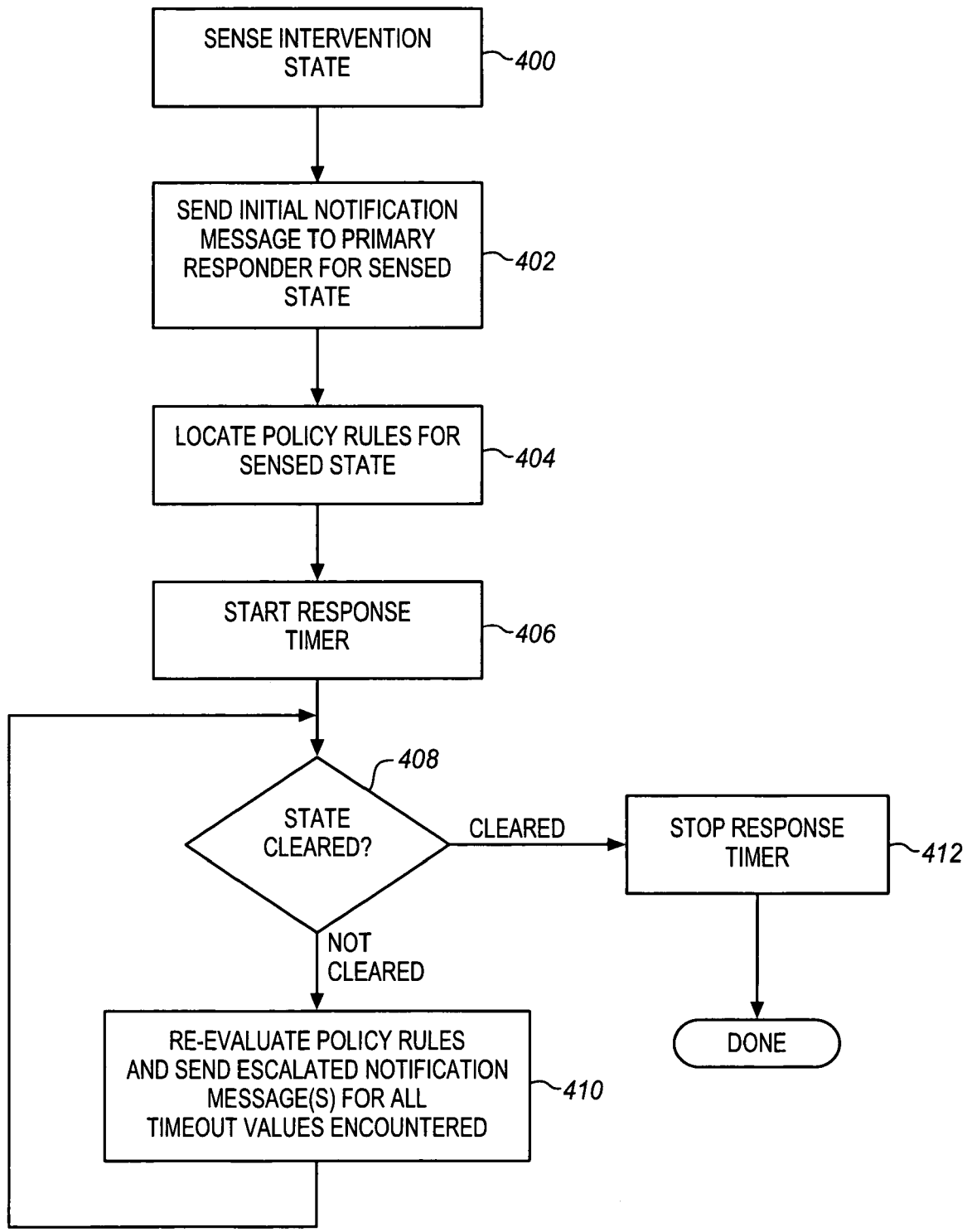
FIGS. 4 and 5 are flowcharts describing exemplary methods in accordance with features and aspects hereof to enhance flexibility of transmission of escalated intervention notification messages in accordance with operating parameters of the printing system.
Figure 5:
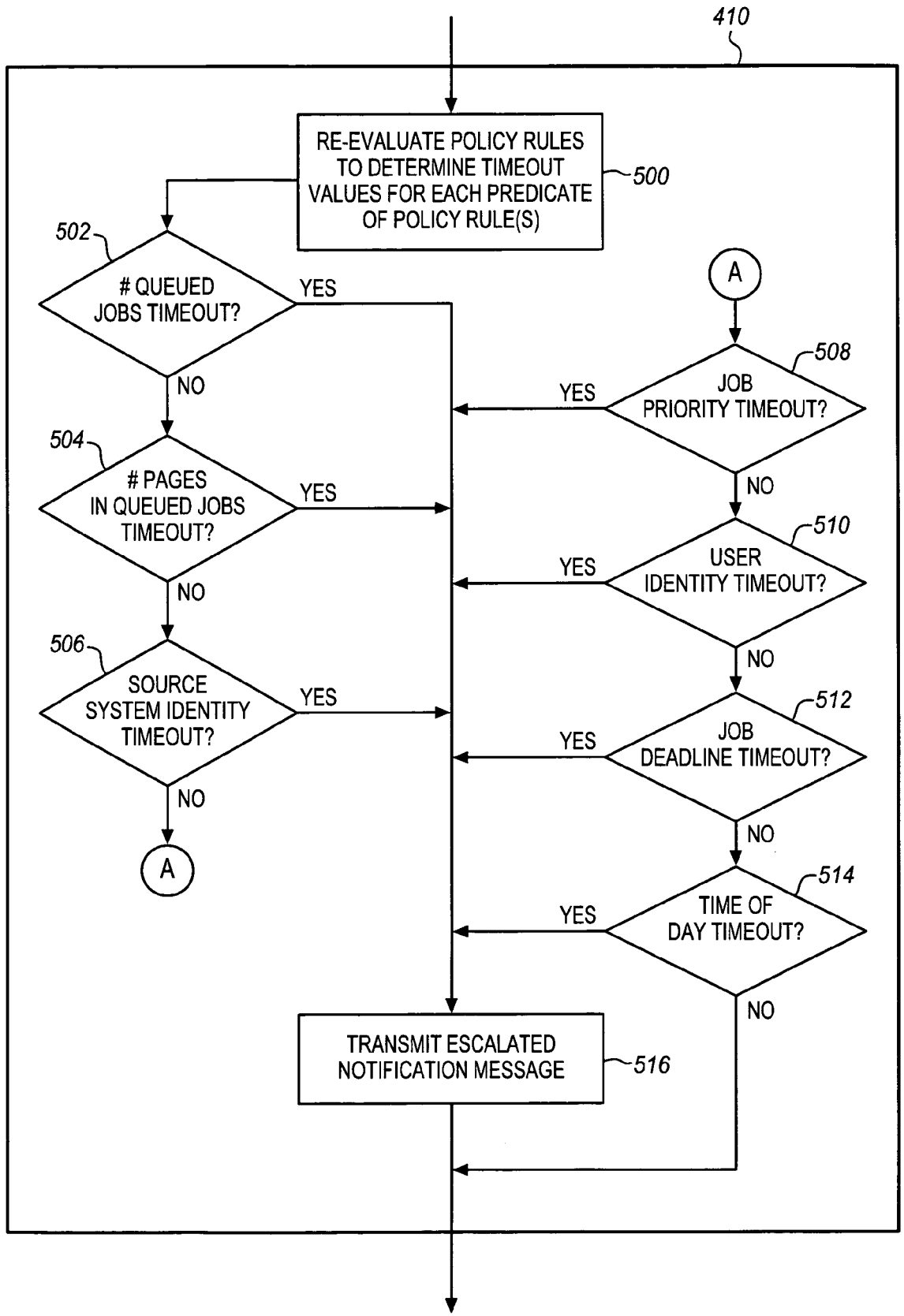

FIGS. 4 and 5 are flowcharts representing an exemplary embodiment of features and aspects hereof to manage escalation of intervention notification messages within a printing system. Element 400 is operable to sense an intervention state within the printing system. Any of several standard interventions states may be sensed by processing of element 400. For example, in the context of a printing system, such states may include: toner low, out of toner, out of paper, paper jam, wrong paper size, etc.

Element 402 is operable to transmit an initial notification message to a primary responder for the particular sensed state. Policy rules may be defined by an administrative user utilizing any of several well-known user interface techniques to describe a predicate test or other syntactical definition of a rule for transmission of an initial notification message. In general, the initial notification message is transmitted essentially immediately following sensing of the intervention state by element 400. An initial notification message may be forwarded to one or more recipients and may be transmitted in one or more messaging formats including, for example, e-mail messages, instant messages, text messages, telephonic messages, paging messages, etc.

Element 404 is next operable to select policy rules for the particular sensed intervention state of the printing system. One or more rules encoded as Boolean logic predicates evaluating present operating parameters of the printing system may be defined for each intervention state sensed by the printer controller operating in accordance with a method of FIG. 4. In other words, for each intervention state several policy rules may be defined. A policy for the presence of a job from a high priority user may be defined for toner out and paper out. A policy rule may be defined for an excessive number of jobs or an excessive number of pages queued in the printing system. Each policy rule defines a timeout value for triggering that particular escalation of the intervention state and/or one or more recipients of an escalation message. All such rules that relate to the particular sensed intervention state are located by element 404. The rules are dynamically and continuously evaluated as a timer is running so that changes in the current operating parameters of the printing system may be sensed as the intervention state has paused operation of the printing system.

Element 406 then starts a response timer or counter counting the elapsed time going forward as the method proceeds awaiting either resolution of the intervention state or a timeout condition justifying transmission of a next escalated intervention notification message. Elements 408 and 410 are iteratively operable to determine whether a next time out value has been reached by the response timer started at element 406 or whether the intervention state has been cleared. If element 408 determines that the intervention state has been cleared, element 412 is operable to stop the response timer and the method completes. If element 408 determines that the intervention state has not been cleared, element 410 is then operable to evaluate all selected policy rules (selected by element 404 above). The rules so evaluated will determine timeout values to be monitored awaiting resolution of the intervention state. Further, if a timeout is encountered, element 410 transmits an appropriate escalated intervention notification message or messages to one or more identified recipients as defined in the evaluated policy rules. Processing then continues looping back to element 408 to continuously check for clearing of the intervention state or further timeout values encountered as defined by the policy rules selected by the operation of element 404.

In essence, upon sensing an intervention state of the printing system, policy rules related to the intervention state are continuously evaluated based on the current operating parameters of the printing system. If a timeout value determined by any such evaluated policy rule is reached before the intervention state is cleared, an appropriate message is forwarded to identified recipients.

FIG. 5 is a flowchart providing additional exemplary details of the processing of element 410 of FIG. 4. Based upon the current value of the upward counting response timer, processing of element 410 compares the current response timer value to the dynamically determined timeout values determined in accordance with the policy rules selected earlier. If any of the timeout values have been reached, an escalated intervention notification message is sent to recipients identified by the policy rule whose timeout expired.

Element 500 of FIG. 5 is first operable to determine the timeout values for all policy rules associated with the sensed intervention state. As noted, one or more policy rules may be defined for a given intervention state. Each rule may define a predicate test of one or more of the plurality of operating parameters of the printing system. Element 500 therefore evaluates each rule applicable to the intervention state of the printing system to determine a corresponding timeout value for that rule. Thus, element 500 evaluates all rules and determines a timeout value associated with each operating parameter of the printing system. As noted above, a timeout value may be determined in accordance with the present operating parameter value for any number of printing system load parameters, print job parameters and attributes, and time of day parameters.

Having so evaluated all applicable rules to thereby determine the multiple possible timeout values for each of the present operating parameters associated with the printing system, element 502 is next operable to determine whether the dynamically determined timeout associated with the number of queued jobs in the printing system has been encountered by the response timer. In other words, element 502 determines whether the response timer reached the values sufficient to trigger a timeout for the number of jobs queued in the printing system. If so, processing continues at element 516 to transmit an appropriate escalated notification message to seek operator assistance in resolving the present intervention state of the printing system thus completing processing of element 410.

If element 502 determines that the number of queued jobs operating parameter timeout value has not yet been exceeded, elements 504 through 514 are then operable in like manner to test each of any other potential timeout values each associated with other operating parameters of the printing system, of the print job, or of the present time of day. In particular, element 504 is operable to test the timeout associated with the number of pages presently queued within the printing system. Element 506 may evaluate a timeout associated with the source system identity that submitted one or more print jobs associated with printing system. Element 508 evaluates a timeout associated with a print job priority corresponding to one or more print jobs in the printing system. Element 510 evaluates the timeout associated with one or more user identities corresponding to submitted print jobs in the printing system. Element 512 may evaluate a timeout associated with a deadline for printing a particular print job in the printing system. Lastly, element 514 may evaluate the timeouts associated with the present time of day as they relate to the end of business, the end of a business shift, or the work hours of a particular support representative. If none of the evaluated timeouts have yet been encountered, element 410 completes processing without transmitting an escalated intervention notification message.

If any of the evaluated timeouts have been encountered according to the current time of the response timer, element 516 is operable to transmit the next escalated intervention notification message. The type and format of a message to be sent as well as the recipients of each message to be sent may be determined from information in the policy rule. In other words, the policy rule whose timeout value has been encountered will identify the type/types of messages to be sent and to whom the messages shall be sent.

The methods of FIGS. 4 and 5 may be implemented as suitably programmed instructions in a general or special purpose processor of the printer controller and such a printer controller may be integral with a printing system or external to the printing system. Such matters of design choice are well known to those of ordinary skill in the art.

Further, the methods of FIGS. 4 and 5 are intended as exemplary of possible embodiments of features and aspects hereof to improve flexibility in defining the timing, format, and recipients for escalated intervention notification messages when an intervention state is sensed in a printing system. Numerous equivalent steps will be readily apparent to those of ordinary skill in the art to provide the features and aspects hereof for managing such escalated intervention notification messages.

Figure 6:
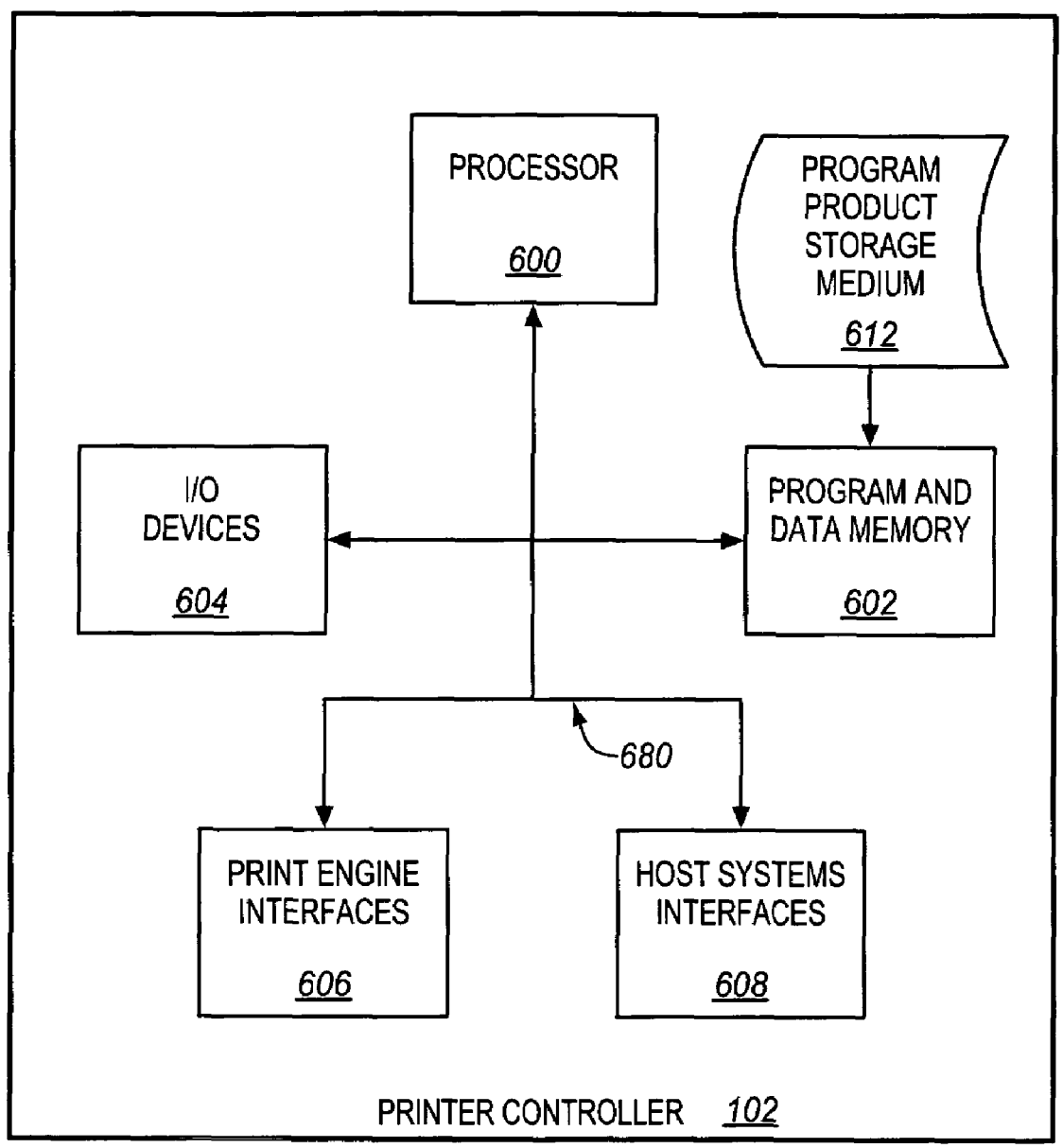
FIG. 6 is a block diagram of an exemplary printer controller enhanced in accordance with features and aspects hereof to enhance flexibility of transmission of escalated intervention notification messages in accordance with operating parameters of the printing system.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 6 is a block diagram depicting a printer controller 102 as including a data processing device (CPU 600 and Memory 602) adapted to provide features and aspects hereof by executing programmed instructions and accessing data stored on a computer readable storage medium 612.

Furthermore, the invention can take the form of a computer program product accessible from a computer-usable or computer-readable medium 612 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor 600 coupled directly or indirectly to memory elements 602 through a system bus 680. The memory elements can include local memory employed during actual execution of the program code, bulk storage, and cache memories which provide temporary storage of at least some program code in order to reduce the number of times code must be retrieved from bulk storage during execution.

Input/output or I/O devices 604 (including but not limited to keyboards, displays, pointing devices, etc.) can be coupled to the system either directly or through intervening I/O controllers. One particular I/O device useful in a data processing system adapted as a printer controller is a print engine interface 606 for coupling the printer controller 102 to the signals and protocols of the print engines adapted for marking pixels on paper.

Network adapters or other host system interfaces 608 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

We claim:

1. A method operable within a printer controller of a printing system, the method comprising:
   sensing an intervention state of the printing system;
   transmitting an initial notification message to one or more recipients to notify the one or more recipients of the sensed intervention state;
   dynamically determining a timeout value to await removal of the intervention state wherein the timeout value is determined in accordance with one or more operating parameters associated with the printing system and wherein the operating parameters include one or more of: a load level of the printing system or an attribute of a print job in the printing system; and
   transmitting an escalated notification message to one or more recipients in response to expiration of the timeout value.

2. The method of claim 1
   wherein the step of transmitting an escalated notification message further comprises transmitting the escalated notification information sooner if the printing system is heavily loaded and later if the printing system is not heavily loaded.

3. The method of claim 1
   wherein the step of transmitting an escalated notification message further comprises transmitting the escalated notification message at a time determined in accordance with the identity of the computer system that submitted the print job.

4. The method of claim 1
   wherein the step of transmitting an escalated notification message farther comprises transmitting the escalated notification message at a time determined in accordance with the identity of an application program that submitted the print job.

5. The method of claim 1 wherein the step of transmitting an escalated notification message farther comprises transmitting the escalated notification message at a time determined in accordance with the identity of a user that submitted the print job.

6. The method of claim 1 wherein the step of transmitting an escalated notification message farther comprises transmitting the escalated notification message at a time determined in accordance with a priority assigned to the print job.

7. The method of claim 1 wherein the step of transmitting an escalated notification message farther comprises transmitting the escalated notification message at a time determined in accordance with a deadline associated with the print job.

8. The method of claim 1 wherein the step of transmitting an escalated notification message farther comprises transmitting the escalated notification message to at least one different recipient than recipients that received the initial notification message.

9. A printer controller associated with a printing system, the printer controller comprising:
an event sensor to sense an event in the printing system; and
a notification manager coupled to the event sensor wherein the notification manager further comprises:
an initial notification transmitter to transmit an initial notification message in response to sensing the event;
a timeout determination element to dynamically determine a timeout value to await removal of the sensed event wherein the timeout value is determined in accordance with one or more operating parameters associated with the printing system and wherein the operating parameters include one or more of: a load level of the printing system or an attribute of a print job in the printing system; and
an escalated notification transmitter operable in response to sensing expiration of the timeout value and adapted to transmit an escalated notification message to one or more recipients.

10. A method operable in a printer controller of a printing system for generating notification messages regarding intervention states of the printing system, the method comprising:
transmitting one or more initial notification messages regarding a sensed intervention state of the printing system;
determining a dynamically determined period of time based on one or more operating parameters of the printing system wherein the operating parameters comprise one or more of: printing system load or attributes of a print job submitted to the printing system;
escalating the intervention state after the dynamically determined period of time through which the intervention state remains active; and
transmitting one or more escalated notification messages in response to expiration of the dynamically determined period of time.

11. The method of claim 10 wherein the step of transmitting one or more escalated notification messages further comprises:
transmitting the one or more escalated notification messages to at least one different recipient than recipients that received the initial notification messages.

12. A computer program product operable in a printer controller the computer program product comprising a computer readable medium embodying a computer readable program, wherein the computer readable program when executed on a printer controller causes the printer controller to perform the steps of:
transmitting one or more initial notification messages regarding a sensed intervention state of the printing system;
determining a dynamically determined period of time based on one or more operating parameters of the printing system wherein the operating parameters comprise one or more of: printing system load or attributes of a print job submitted to the printing system;
escalating the intervention state after the dynamically determined period of time through which the intervention state remains active; and
transmitting one or more escalated notification messages in response to expiration of the dynamically determined period of time.

13. The program product of claim 12 wherein the performed step of transmitting one or more escalated notification messages further comprises:
transmitting the one or more escalated notification messages to at least one different recipient than recipients that received the initial notification messages.

* * * * *

UNITED STATES PATENT AND TRADEMARK OFFICE
CERTIFICATE OF CORRECTION

| | | |
|---|---|---|
| PATENT NO. | : 7,675,638 B2 | Page 1 of 1 |
| APPLICATION NO. | : 11/331720 | |
| DATED | : March 9, 2010 | |
| INVENTOR(S) | : Czyszczewski et al. | |

It is certified that error appears in the above-identified patent and that said Letters Patent is hereby corrected as shown below:

In column 10, line 64, the text "farther comprises" should read "further comprises".

In column 11, line 3, the text "farther comprises" should read "further comprises".

In column 11, line 8, the text "farther comprises" should read "further comprises".

In column 11, line 13, the text "farther comprises" should read "further comprises".

In column 11, line 18, the text "farther comprises" should read "further comprises".

Signed and Sealed this

Eighteenth Day of January, 2011

David J. Kappos
*Director of the United States Patent and Trademark Office*